US011310097B2

(12) United States Patent
Koundinya et al.

(10) Patent No.: US 11,310,097 B2
(45) Date of Patent: Apr. 19, 2022

(54) VIRTUAL STACK RECOVERY

(71) Applicant: HEWLETT PACKARD ENTERPRISE DEVELOPMENT LP, Houston, TX (US)

(72) Inventors: Chivukula Koundinya, Bangalore (IN); Subhashini Natarajan, Bangalore (IN); Harish Shivaram, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 172 days.

(21) Appl. No.: 16/742,042

(22) Filed: Jan. 14, 2020

(65) Prior Publication Data
US 2020/0244515 A1  Jul. 30, 2020

(30) Foreign Application Priority Data

Jan. 24, 2019  (IN) .............................. 201941003074

(51) Int. Cl.
*H04L 12/24*  (2006.01)
*H04L 12/46*  (2006.01)
*H04L 41/0654*  (2022.01)

(52) U.S. Cl.
CPC ...... *H04L 41/0654* (2013.01); *H04L 12/4641* (2013.01)

(58) Field of Classification Search
CPC ............. H04L 12/4641; H04L 41/0654; H04L 41/0893; H04L 43/0817
See application file for complete search history.

(56) References Cited

U.S. PATENT DOCUMENTS

| 2010/0014433 A1 | 1/2010 | Wang et al. |
| 2010/0329111 A1 | 12/2010 | Wan et al. |
| 2017/0331676 A1 | 11/2017 | Chen et al. |

FOREIGN PATENT DOCUMENTS

| CN | 102916857 | 4/2015 |
| CN | 104579809 | 5/2018 |

OTHER PUBLICATIONS

Huawei (S2750EI&S5700 Series Ethernet Switches V200R007(C00 &C10); Configuration Guide—Device Management; Issue 06, Date: Dec. 29, 2017) (Year: 2017).*
Semperboni, F., "Cisco 6500 VSS Configuration," CicsoZine, Nov. 26, 2014, https://www.ciscozine.com/cisco-vss-configuration/.

* cited by examiner

*Primary Examiner* — Melvin C Marcelo
*Assistant Examiner* — Natali Pascual Peguero
(74) *Attorney, Agent, or Firm* — Hewlett Packard Enterprise Patent Department

(57) ABSTRACT

Examples disclosed herein relate to a method comprising detecting, by a first network device, an interruption in a network stack of network devices connected to each other through a plurality of dedicated links. The method may also include identifying, by the first network device, a network device in the network stack with a highest split priority, determining, by the first network device, that the network device with the highest split priority belongs to a first fragment of the network stack and marking, by the first network device, the first fragment as an active fragment of the network stack.

20 Claims, 5 Drawing Sheets

VIRTUAL STACK RECOVERY

BACKGROUND

Multiple devices on a network, such as a router or switch, may be connected via a communication link, such as ethernet, to form a single virtual device, also known as a stack. If a break occurs in the communication link connecting the devices, a stack split may occur.

BRIEF DESCRIPTION OF THE DRAWINGS

Some implementations of the present disclosure are described with respect to the following figures.

Figure 1:
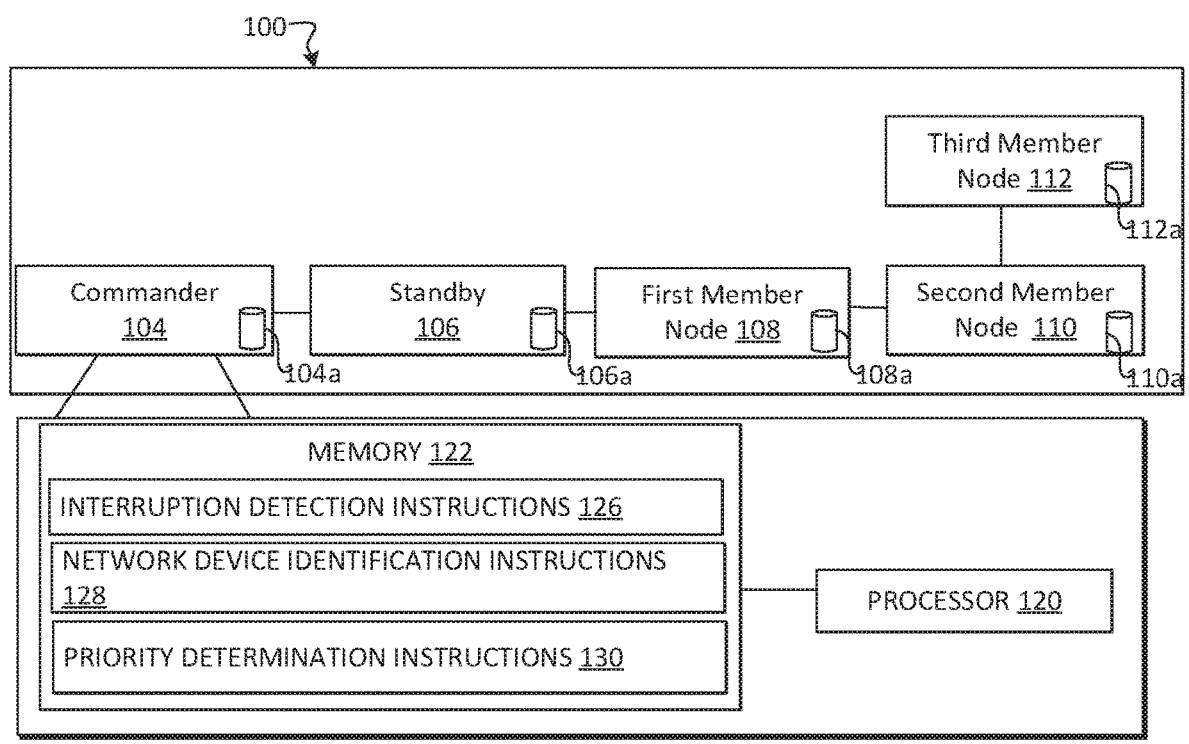
FIG. 1 is a block diagram of an example system for virtual stack recovery.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

Stacking is a network virtualization technology which virtualizes multiple physical switches in the same layer into one Virtual Switching Framework (VSF) stack. A VSF stack may support a variety of topologies, such as ring and chain topologies. The VSF stack may provide resiliency, scalability and higher bandwidth. VSF allows supported member network devices, such as network switches, to be connected to each other through dedicated point-to-point connections. These connections may include, for example, copper or fiber Ethernet links and may be referred to as VSF links. These links carry encapsulated data plane traffic, and may also exchange control plane traffic that helps the VSF stack maintain its topology and state, thereby behaving like a single logical switch.

When a VSF link within the stack goes down (say, due to a member switch going down, or stack link cut between any two switches), the VSF stack may split into two or more fragments which are not inter-connected. Accordingly, it may be helpful to select the right fragment to remain active, so the resultant network disruption is minimized.

To avoid this, some VSF stacks may support a multiple-active detection (MAD) mechanism. This mechanism may be used in the event of a stack split to restrict the number of active fragments to exactly one. Using this mechanism, one fragment will continue to operate as normal, while the other fragment(s) shut down all front-plane ports, thereby preventing duplicate IP/MAC related problems.

For example, in networks supporting the Out of band Management (OOBM) MAD, a management port of one or more network devices may be used to detect the presence of other stack fragments, and their individual sizes. Depending on the result of this detection process, the stack will choose to either stay active or become inactive. The pre-requisite for this process is that the user must, as part of the deployment, connect all management ports from all members to an L2 network. Another example is VLAN-MAD which uses one front-plane port from each stack member on the management VLAN instead of the management port. Again, the pre-requisite is the connection of a single port from each member to an L2 network. A third example is an LLDP-MAD, which works only for 2-member stacks. It uses a combination of LLDP, LACP and SNMP protocols to query a peer switch (either an uplink or downlink switch) connected to the stack using an L-Agg with exactly one port on each stack member. The algorithm queries the peer switch for the state of the other port of the L-Agg, and makes the active/inactive decision based on the result.

However, these solutions have a variety of problems. For example, the solutions are non-deterministic and typically require an intermediate device or other onerous configuration requirements. Depending on the nature of the stack split, and the size of the fragments, some stack switches will remain operational. For a given stack member, it may also be unpredictable if the switch will remain operational in the event of a stack split.

The systems and methods discussed herein use a priority based multiple-active detection (MAD) mechanism for virtual stack recovery. The configurable switch priority will be used to make a decision on identifying a fragment to be kept active, so that uplink/access points will not go down due to a stack split. The solution outlined here can work for VSF stacks with any number of members and any supported topologies.

This allows the user to control if a switch will remain active in the event of a stack split, via a stack-split priority configuration. When a stack split happens, or any stack member fails, the stack fragment which has the highest priority configured member present will become an active stack-fragment. Advantageously, this technique does not require each network device to be connected to an intermediary device for resolving stack splits.

In at least one embodiment, the subject matter claimed below includes a method. The method may comprise detecting, by a first network device, an interruption in a network stack of network devices connected to each other through a plurality of dedicated links, wherein the interruption splits the network stack into two or more fragments. The method may also comprise identifying, by the first network device, a network device in the network stack with a highest split priority and determining, by the first network device, that the network device with the highest split priority belongs to a first fragment of the network stack, wherein the first network device also belongs to the first fragment of the network stack. The method may also comprise marking, by the first network device, the first fragment as an active fragment of the network stack.

FIG. 1 is a block diagram of an example system for stateful virtual stack recovery. A networking system 100, may include a plurality of network devices 104-112. The plurality of network devices 104-112 may be connected via a communication link to form a single virtual device, also known as a stack. The communication link may be a physical link, such as Ethernet, a wireless link, etc.

A communication link may a logical interface that connects VSF member devices. The physical interfaces assigned to the communication link may automatically form an aggregate VSF link. The links may also be used to synchronize the control plane traffic that helps the VSF stack maintain its topology and state so as to behave like a single switch. The links may also carry encapsulated data plane traffic.

The network devices may, for example, be network switches with routing capabilities such that the network device is responsible for routing data along a route (or equivalently, path) in the network. The network device may perform, for example, routing of data based on routing information accessible by the router. For example, the routing information can be stored on a storage medium of the network device, or on a storage medium separate from but accessible by the network device.

As described above, virtual Stack Forwarding (VSF) is one technology which enables multiple network devices to be connected via an Ethernet link to form a stack. The devices can be connected in, for example, a chain or a ring topology to form the VSF Stack. The VSF stack can span across multiple geographical locations, such as multiple buildings. Each network device in the VSF stack may be assigned a specific role, such as a commander, a standby or a member role.

The commander node may be responsible for managing the forwarding databases, synchronizing them with the Standby and controlling all line cards including that of the Standby. The commander node may also run control and management plane protocols. The standby node is a statefull backup device for the commander node and may take control of the VSF virtual chassis if the commander node crashes. This enables the VSF virtual chassis to continue its operations seamlessly during a failure.

Each of the devices in the VSF stack other than the commander and standby nodes may become member nodes. The member nodes may not run any networking protocols and may not store state information of the network. The ports on this switch may be directly controlled and programmed by the commander switch. When a standby takes over as commander, one of the member nodes may be upgraded to standby role.

In such an implementation, when the stack is initially formed, one network device in the stack will be selected as a commander node and another one will be selected as standby node. The other devices in the stack will act as member nodes. The commander node may synchronize the configuration of the stack to the standby node and/or one or more of the other member nodes, so that in the event of failure of the commander node, the standby (or other) node can take over as the commander node with minimal interruption of service.

The system 100 includes an example VSF stack including network devices designated as a commander device 104, a standby device 106, a first member node 108, a second member node 110 and a third member node 112. Each of these network devices may have a corresponding local database, 104a-112a, respectively. The local database may be a centralized database, storing the state and configuration of the network switch as well as state and configuration of other devices of the network or of the network in general.

Each device may subscribe to the local database of each other device in the stack, network, etc. to receive changes.

Each network device may store some or all of the configuration, status, states and statistics of the network, and/or other devices on the network at any given point at time. The different state data may be accessed from the database either individually (data for a given time, a given device, etc.) or in aggregate (data aggregated for particular items over a given time period, etc.).

Each network device may also have a corresponding priority value. The priority value may be, for example, a number, letter, etc. The priority value may be configured by a user, such as a network administrator to be used in determining which segment to keep active in the event of a stack split. In the example scenario depicted in FIG. 1, the standby node may have a priority value of 100, the commander node may have a priority value of 100 and each of the member nodes may have a priority value of 10.

System 100 may include a processor 120 and a memory 122 that may be coupled to each other through a communication link (e.g., a bus). Processor 120 may include a single or multiple Central Processing Units (CPU) or another suitable hardware processor(s). In some examples, memory 122 stores machine readable instructions executed by processor 120 for system 100. Memory 122 may include any suitable combination of volatile and/or non-volatile memory, such as combinations of Random Access Memory (RAM), Read-Only Memory (ROM), flash memory, and/or other suitable memory.

Memory 122 stores instructions to be executed by processor 120 including instructions for interruption detection 126, network device identification 128, priority determination 130, and/or other components. According to various implementations, system 100 may be implemented in hardware and/or a combination of hardware and programming that configures hardware. Furthermore, in FIG. 1 and other Figures described herein, different numbers of components or entities than depicted may be used. Although the processor 120 and memory 122 are depicted in FIG. 1 as part of commander 104, this is for example purposes only and each of the plurality of network devices 104-112 may have a similar processor and memory and execute instructions similar to those discussed in FIGS. 1-5

Processor 120 may execute interruption detection instructions 126 to detect, by a first network device, an interruption in the network stack of network devices connected to each other through a plurality of dedicated links, wherein the interruption splits the network stack into two or more fragments. The network stack may include three or more network devices. Multiple physical network devices in a same layer of a network may be virtualized into one Virtual Switching Framework (VSF) stack. No network devices in the network stack may be connected to an intermediary network device used for managing stack splits. For example, neither a management port nor a front-plane port of the first network device may not used to connect the first network device to an intermediary network device used for managing stack splits.

Processor 120 may execute network device identification instructions 128 to identify, by the first network device, a network device in the network stack with a highest split priority. A split priority for each network device in the network stack may be stored on each network device in the network stack, including the first network device.

Processor 120 may execute priority determination instructions 130 to determine, by the first network device, whether the network device with the highest split priority belongs to a first fragment of the network stack including the first network device. If it is determined that the network device with the highest split priority belongs to the first fragment of the network stack, processor 120 may execute priority determination instructions 130 to mark, by the first network device, the first fragment as an active fragment of the network stack. Marking may be done in a variety of ways. For example, a run time state of the fragment may be updated in a run-time state database where all run-time states are stored. Example run-time state databases may be a part of corresponding local database, 104a-112a, described above in reference to FIG. 1 and system 100. If previously the fragment was inactive and now it became active (because inactive has gone down), front-plane ports of one or more network switches in the fragment which were previously disabled may be enabled.

If it is determined that the network device with the highest split priority does not belongs to the first fragment of the network stack, processor 120 may execute priority determination instructions 130 to mark, by the first network device, the first fragment as an inactive fragment of the network stack. For example, a run time state of the fragment may be updated in a run-time state database where all run-time states are stored. Example run-time state databases may be a part of corresponding local database, 104a-112a, described above in reference to FIG. 1 and system 100.

Figure 2:
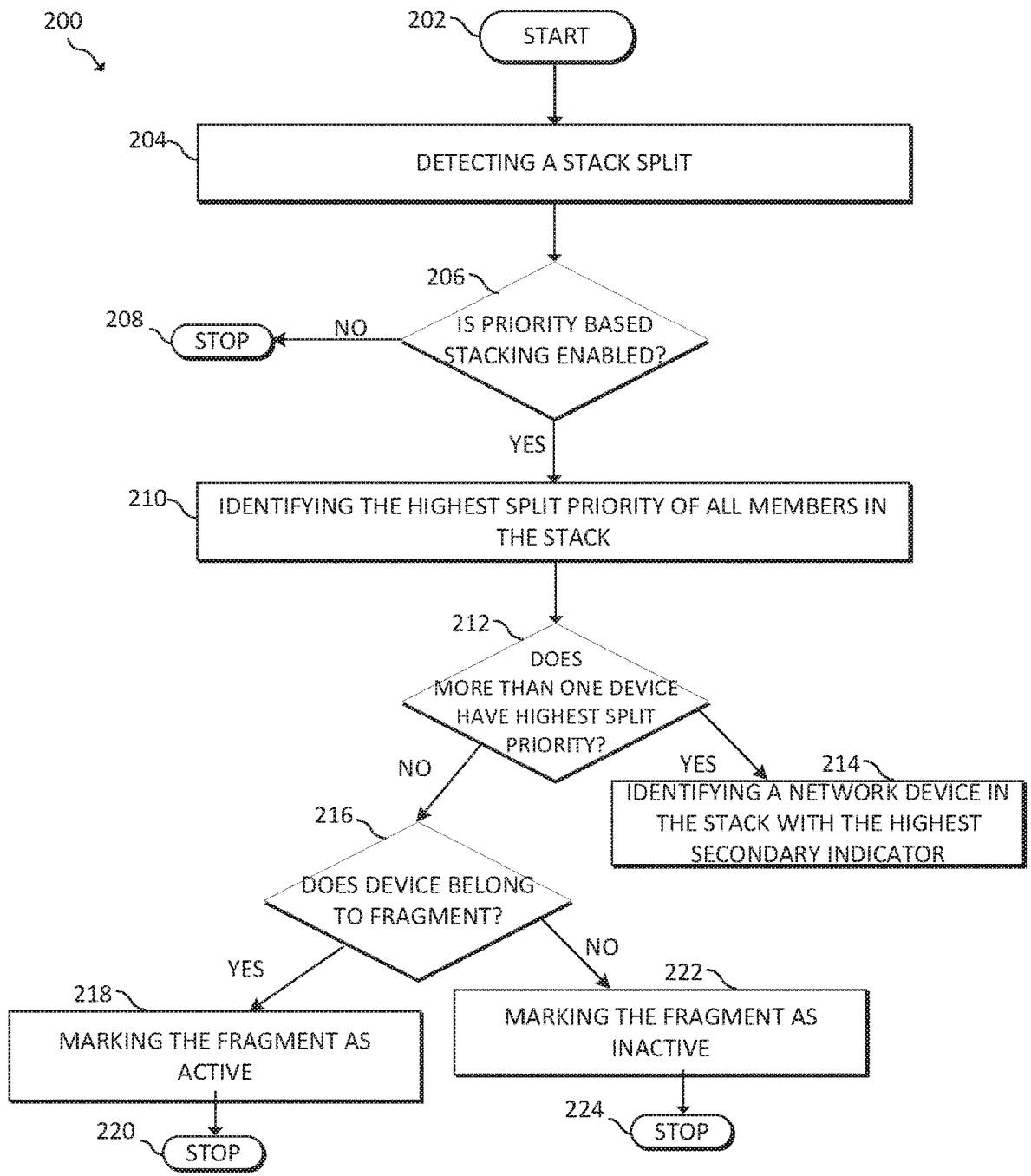
FIG. 2 is a flow diagram of an example method for virtual stack recovery.

FIG. 2 is a flow diagram of another example method for virtual stack recovery. This method may be performed by each network device in a network stack, such as network devices 104-112 depicted in system 100 of FIG. 1. The method 200 may begin at block 202 and proceed to block 204 where the method may include detecting a stack split. Detecting a stack split may be done in a variety of ways. For example, if a link connecting Commander 104 and the standby 106 goes down, the commander 104 may detect that the standby is no longer reachable via the link. Likewise, the standby may detect that the commander is no longer reachable via the link and thus the standby 106 may become the new commander for the fragment containing devices 106-112. The stack may split into multiple fragments and each spilt fragment may have all the configuration and state to operate as a stack by itself.

At block 206, the method may include determining if priority based stacking recovery is enabled. Determining if priority based stacing recovery is enabled may be done in a variety of ways. For example, the network devices, such as the network devices 104-112 of system 100 of FIG. 1, may have configuration data bases (104a-112a, respectively) where the user configuration is stored. When priority based stacking recovery method is enabled, such as by a system administrator, by factory default, by a user, etc, a configuration item may written/stored into the configuration database.

If it is determined that priority based stacking recovery is not enabled (NO branch of block 206), then the method may proceed to block 208, where the method may end. If it is determined that priority based stack recovery is enabled (YES branch of block 206), then at block 210, the method may include identifying the highest split priority of all members in the stack. As explained above, a split priority may be configured for each network device in the stack. Upon creation of the stack (and/or periodically during operation of the network), the split priority for each network device on the stack may be stored on each network device on the stack. Accordingly, in the event of a stack split, each member device is able to retrieve the split priority for each other member, even in the event that communication links are broken between different devices in the stack. Once a member device has retrieved the split priority for each member of the stack, the member device may compare them and determine which network device or devices have the highest split priority. The split priority may be a numerical value, or some other value. In some aspects, other data may be used as the split priority, such as address, etc.

At block 212, the method may include determining if more than device in the network stack has the highest split priority. As described above, it may be desirable to configure multiple devices to have the highest split priority, if it is desired to have multiple fragments active in the event of a stack split. If it is determined that only 1 device in the network stack has the highest split priority (NO branch of block 212), the method may proceed to block 216. If it is determined that more than 1 device in the network stack has the highest split priority (YES branch of block 212), then the method may proceed to block 214, where the method may include identifying a network device in the stack, from among the network devices having the highest split priority, with the highest secondary indicator. The determined network device is then considered to be the network device with the highest split priority.

A variety of different data may be used as a secondary indicator. In some aspects, each network device may also have a member number and this member number may be used as the secondary indicator. For example, in system 100 in FIG. 1, commander 104 may be member 1 and standby 106 may be member 2. If both devices are configured with same highest split priority network device 104 will become the active fragment since it has lowest member number.

The method may proceed to block 216, where the method may include determining whether the network device with the highest split priority belongs to the same fragment as the network device carrying out the method. As described above, the method 200 may be performed by each network device in the network stack upon detection of a stack split that splits the network into multiple fragments. Accordingly, the network device performing the method will check to determine if the network device with the highest split priority is in the same fragment as the network device performing the method. If it is determined that that the network device with the highest split priority belongs to the same fragment as the network device carrying out the method (YES branch of block 216), the method may proceed to block 218, where the method may include marking the fragment that the network device performing the method belongs to as active. The method may proceed to block 220, where the method may end.

If it is determined that that the network device with the highest split priority does not belong to the same fragment as the network device carrying out the method (NO branch of block 216), the method may proceed to block 222, where the method may include marking the fragment that the network device performing the method belongs to as inactive. If a fragment is marked as inactive, each of the front plane ports on devices in the fragment may be disabled. The method may proceed to block 224, where the method may end.

Turning again, to FIG. 1, an example scenario will be described in reference to system 100. Consider the case when the stack gets split such a way that commander node 104 and standby 106 are in one fragment and member nodes 108-112 are in a second fragment. In a traditional configuration, the second fragment that doesn't have either the commander or standby may become the active fragment because it has a larger number of devices. This, however, may be an undesirable resolution as it may cause network disturbance because there is no uplink connected to the members 3-5.

Using the systems and methods described herein, such as, for example, method 200 the fragment which has the highest priority configured member present will become active and the other fragment will become inactive. If the fragment doesn't have highest priority member configured, then it will go down. In the present example, the both the commander and standby devices have a split priority of 100 and the member devices have a split priority of 10. Accordingly, the stack fragment with the highest split priority is the first fragment and the first fragment will be active and the second fragment will not be active and will go down. With this network connectivity is not lost and users will be able to manage the network.

However, this is merely an example for illustrative purposes and the systems and method described herein can be used in situation where there are other numbers of network devices, different numbers of stack splits and different device priorities. Importantly, the systems and methods described herein work regardless of stack size, position of stack split and without the need of any intermediate device or protocol-based exchange of packets between network devices in the stack. Single or multiple fragments can be made active with this feature.

Figure 3:
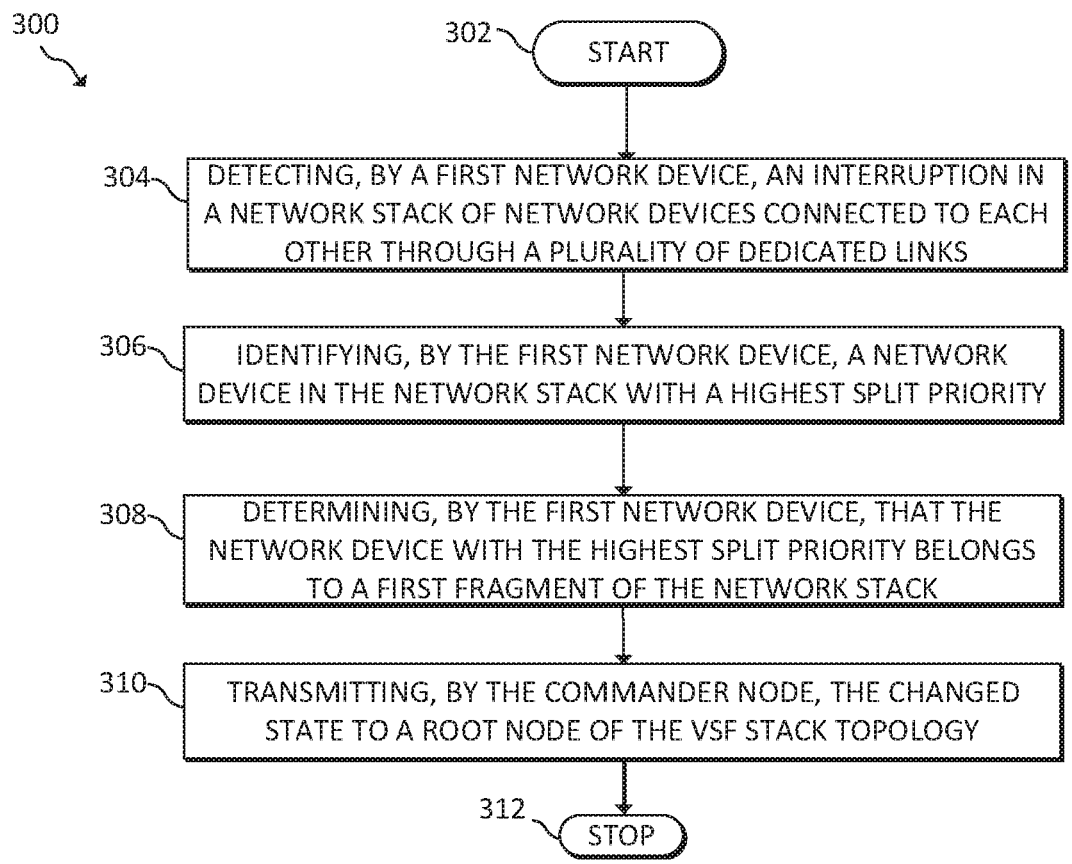
FIG. 3 is a flow diagram of an example method for virtual stack recovery.

FIG. 3 is a flow diagram of another example method for virtual stack recovery. The method 300 may begin at block 302 and proceed to block 304 where the method may include detecting, by a first network device, an interruption in a network stack of network devices connected to each other through a plurality of dedicated links, wherein the interruption splits the network stack into two or more fragments. The network stack includes three or more network devices. Multiple physical network devices in a same layer of a network are virtualized into one Virtual Switching Framework (VSF) stack. No network devices in the network stack may be connected to an intermediary network device used for managing stack splits. For example, neither a management port nor a front-plane port of the first network device may not be used to connect the first network device to an intermediary network device used for managing stack split.

At block 306, the method may include identifying, by the first network device, a network device in the network stack with a highest split priority. A split priority for each network device in the network stack is stored on each network device in the network stack, including the first network device.

At block 308, the method may include determining, by the first network device, that the network device with the highest split priority belongs to a first fragment of the network stack, wherein the first network device also belongs to the first fragment of the network stack. At block 310, the method may include marking, by the first network device, the first fragment as an active fragment of the network stack. The method may proceed to block 312, where the method may end.

Figure 4A:
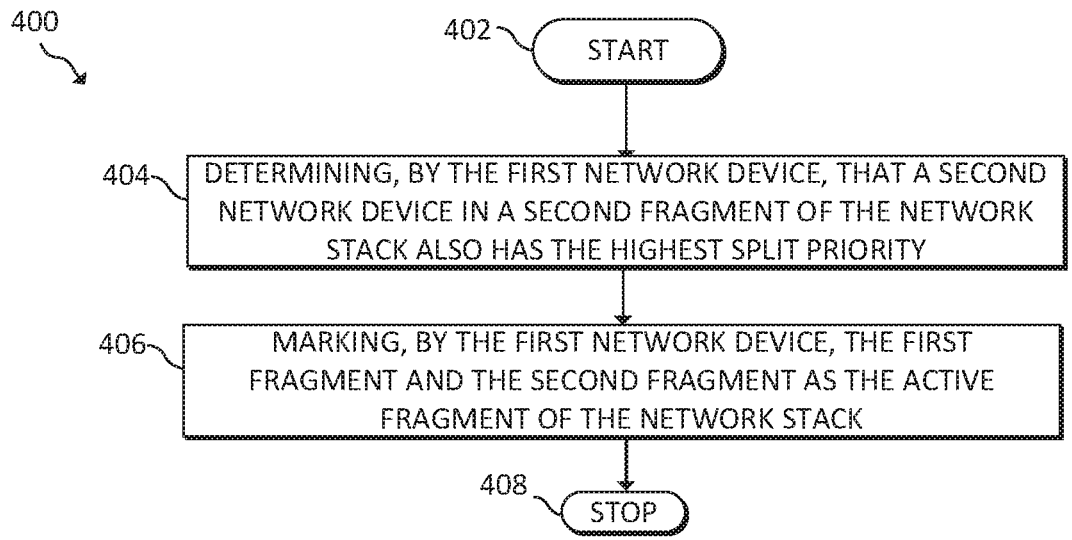
FIG. 4A is a flow diagram of another example method for virtual stack recovery.
Figure 4B:
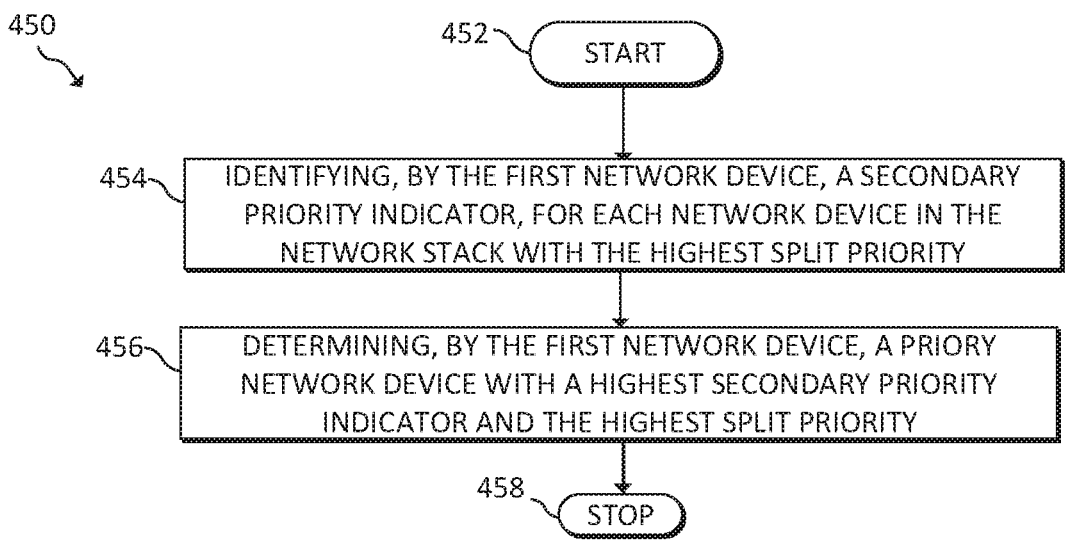
FIG. 4B is a flow diagram of another example method for virtual stack recovery.

FIGS. 4A and 4B are flow diagrams of example method for virtual stack recovery.

In some aspects, multiple network devices may be configured with the highest split priority to allow multiple fragments to become active in the case of a stack split. For example, a network administrator may desire that a fragment that has either the commander or standby to remain active after a split. This is described in method 400.

Method 400 may begin at block 402 and proceed to block 404 where the method may include determining, by the first network device, that a second network device in a second fragment of the network stack also has the highest split priority. At block 406, the method may include marking, by the first network device, the first fragment and the second fragment as the active fragment of the network stack. The method may proceed to block 408, where the method may end.

In some aspects, multiple network devices may be configured with the highest split priority, but it is not desired for more than one fragment to be active after a stack split. This is described in method 450.

Method 450 may begin at block 452 and proceed to block 454 where the method may include identifying, by the first network device, a secondary priority indicator, for each network device in the network stack with the highest split priority. In some aspects, a secondary priority indicator may be configured for each network. In other aspects, other data may be used as the secondary priority indicator. For example, the secondary priority indicator may be the network device having the a lowest member number among the members having same highest split priority At block 456, the method may include determining, by the first network device, a priory network device with a highest se condary priority indicator and the highest split priority. The method may proceed to block 458, where the method may end.

Figure 5:
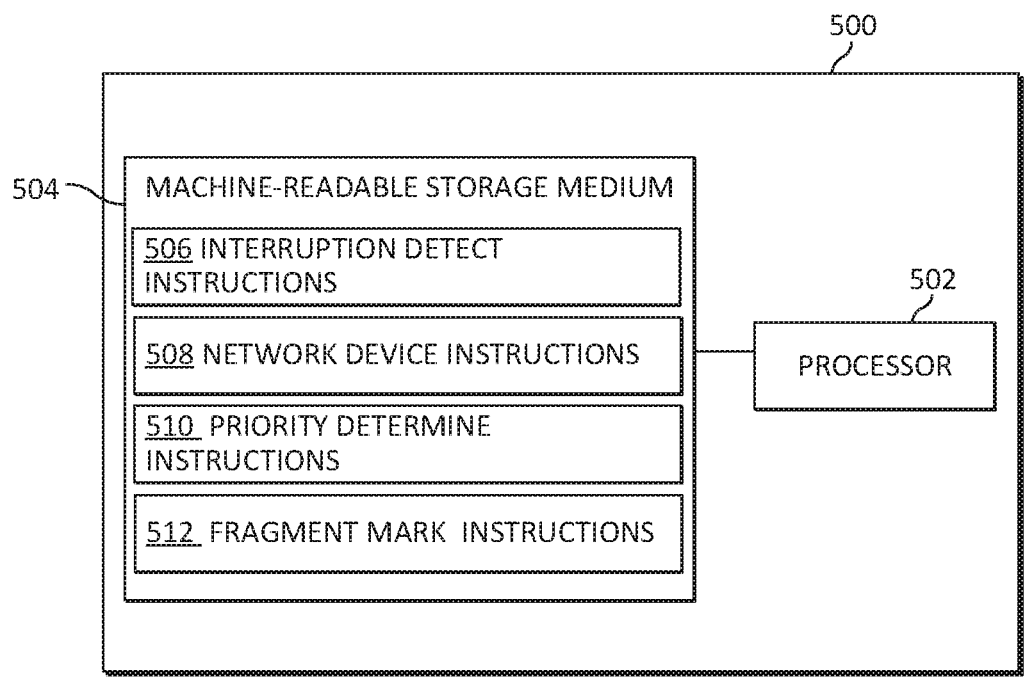
FIG. 5 is a block diagram of an example storage medium storing machine-readable instructions for virtual stack recovery.

FIG. 5 is a block diagram of an example storage medium storing machine-readable instructions for virtual stack recovery. In the example illustrated in FIG. 5, system 500 includes a processor 502 and a machine-readable storage medium 504. In some aspects, processor 502 and machine-readable storage medium 504 may be part of an Application-specific integrated circuit (ASIC). Although the following descriptions refer to a single processor and a single machine-readable storage medium, the descriptions may also apply to a system with multiple processors and multiple machine-readable storage mediums. In such examples, the instructions may be distributed (e.g., stored) across multiple machine-readable storage mediums and the instructions may be distributed (e.g., executed by) across multiple processors.

Processor 502 may be at least one central processing unit (CPU), microprocessor, and/or other hardware devices suitable for retrieval and execution of instructions stored in machine-readable storage medium 504. In the example illustrated in FIG. 5, processor 502 may fetch, decode, and execute instructions 506, 508, 510 and 512. Processor 502 may include at least one electronic circuit comprising a number of electronic components for performing the functionality of at least one of the instructions in machine-readable storage medium 504. With respect to the executable instruction representations (e.g., boxes) described and shown herein, it should be understood that part or all of the executable instructions and/or electronic circuits included within one box may be included in a different box shown in the figures or in a different box not shown.

Machine-readable storage medium 504 may be any electronic, magnetic, optical, or other physical storage device that stores executable instructions. Thus, machine-readable storage medium 504 may be, for example, Random Access Memory (RAM), an Electrically-Erasable Programmable Read-Only Memory (EEPROM), a storage drive, an optical disc, and the like. Machine-readable storage medium 504 may be disposed within system 500, as shown in FIG. 5. In this situation, the executable instructions may be "installed" on the system 500. Machine-readable storage medium 504 may be a portable, external or remote storage medium, for example, that allows system 500 to download the instructions from the portable/external/remote storage medium. In this situation, the executable instructions may be part of an "installation package". As described herein, machine-readable storage medium 504 may be encoded with executable instructions for context aware data backup. The machine-readable storage medium may be non-transitory.

Referring to FIG. 5, interruption detect instructions 506, when executed by a processor (e.g., 502), may cause system 500 to detect, by a first network device, an interruption in a network stack of network devices connected to each other through a plurality of dedicated links, wherein the interruption splits the network stack into two or more fragments. The network stack may include three or more network devices.

Multiple physical network devices in a same layer of a network may be virtualized into one Virtual Switching Framework (VSF) stack. No network devices in the network stack may be connected to an intermediary network device used for managing stack splits. For example, neither a management port and a front-plane port of the first network device may not be used to connect the first network device to an intermediary network device used for managing stack splits.

Network device instructions 508, when executed by a processor (e.g., 502), may cause system 500 to identify, by the first network device, a network device in the network stack with a highest split priority. A split priority for each network device in the network stack may be stored on each network device in the network stack, including the first network device Priority determine instructions 510, when executed by a processor (e.g., 502), may cause system 500 to determine, by the first network device, that the network device with the highest split priority does not belong to a first fragment of the network stack, wherein the first network device also belongs to the first fragment of the network stack.

Fragment mark instructions 512, when executed by a processor (e.g., 502), may cause system 500 to mark, by the first network device, the first fragment as an inactive fragment of the network stack.

The foregoing disclosure describes a number of examples for virtual stack recovery. The disclosed examples may include systems, devices, computer-readable storage media, and methods for virtual stack recovery. For purposes of explanation, certain examples are described with reference to the components illustrated in FIGS. 1-5. The content type of the illustrated components may overlap, however, and may be present in a fewer or greater number of elements and components. Further, all or part of the content type of illustrated elements may co-exist or be distributed among several geographically dispersed locations. Further, the disclosed examples may be implemented in various environments and are not limited to the illustrated examples.

Further, the sequence of operations described in connection with FIGS. 1-5 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples.

The invention claimed is:

1. A method comprising:
  detecting, by a network device, an interruption in a network stack of network devices coupled to each other through a plurality of links, wherein a split priority value is allocated to a respective network device of the network stack, and wherein the interruption splits the network stack into two or more fragments;
  in response to detecting the interruption, identifying, by the network device, a first network device with a highest split priority value in the network stack;
  determining, by the network device, that the first network device with the highest split priority belongs to a first fragment of the network stack; and
  in response to the network device belonging to the first fragment, marking, by the network device, the first fragment as an active fragment of the network stack.

2. The method of claim 1, wherein a split priority for each network device in the network stack is stored on each network device in the network stack.

3. The method of claim 1, wherein a subset of the network devices in a same layer of a network are virtualized into a Virtual Switching Framework (VSF) stack.

4. The method of claim 1, wherein the network devices in the network stack are not connected to an intermediary network device used for managing stack splits.

5. The method of claim 1, wherein a front-plane port of the network device is not coupled to an intermediary network device used for managing stack splits.

6. The method of claim 1, further comprising:
  determining, by the network device, that a second network device in a second fragment of the network stack is associated with the highest split priority value.

7. The method of claim 6, further comprising:
  marking, by the network device, the first fragment and the second fragment as the active fragment of the network stack.

8. The method of claim 6, further comprising:
  identifying, by the network device, a secondary priority indicator for the first and second network devices.

9. The method of claim 8, wherein determining the first fragment as the active fragment of the network stack further comprises:
  determining, by the network device, that the first network device is associated with a highest secondary priority indicator and the highest split priority value.

10. A non-transitory machine-readable storage medium encoded with instructions, the instructions executable by a processor of a system to cause the system to:
  detect, by a network device, an interruption in a network stack of network devices coupled to each other through a plurality of links, wherein a split priority value is allocated to a respective network device of the network stack, and wherein the interruption splits the network stack into two or more fragments;
  in response to detecting the interruption, identify, by the network device, a first network device with a highest split priority value in the network stack;
  determine, by the network device, that the first network device with the highest split priority belongs to a first fragment of the network stack; and
  in response to the network device belonging to the first fragment, mark, by the network device, the first fragment as an active fragment of the network stack.

11. The non-transitory computer-readable storage medium of claim 10, the instructions executable by the processor to further cause the system to:
  determine, in response to the network device not belonging to the first fragment, that the network device belongs in a second fragment of the network stack; and
  mark, by the network device, the second fragment as an inactive fragment of the network stack.

12. The non-transitory computer-readable storage medium of claim 10, the instructions executable by the processor to further cause the system to:
- determine, by the first network device, that a third network device in a third fragment of the network stack is associated with the highest split priority value; and
- mark, by the first network device, the first segment and the third fragment as the active fragment of the network stack.

13. The non-transitory computer-readable storage medium of claim 10, the instructions executable by the processor to further cause the system to:
- determine, by the network device, that multiple network devices in the network stack are associated with the highest split priority value; and
- identify, by the network device, a secondary priority indicator, for each of the multiple network devices; and
- wherein determining the first fragment as the active fragment of the network stack further comprises determining, by the network device, that the first network device is associated with with a highest secondary priority indicator and the highest split priority.

14. The non-transitory computer-readable storage medium of claim 10 wherein the network devices in the network stack are not connected to an intermediary network device used for managing stack splits.

15. The method of claim 10, further comprising:
- determining, in response to the network device not belonging to the first fragment, that the network device belongs in a second fragment of the network stack; and
- marking, by the network device, the second fragment as an inactive fragment of the network stack.

16. A system comprising:
a processor; and
a memory storing instructions that when executed by the processor cause the system to:
- detect, by a network device, an interruption in a network stack of network devices coupled to each other through a plurality of links, wherein a split priority value is allocated to a respective network device of the network stack, and wherein the interruption splits the network stack into two or more fragments;
- in response to detecting the interruption, identify, by the network device, a first network device with a highest split priority value in the network stack;
- determine, by the network device, that the first network device with the highest split priority belongs to a first fragment of the network stack; and
- in response to the network device belonging to the first fragment, mark, by the network device, the first fragment as an active fragment of the network stack.

17. The system of claim 16 wherein a split priority for each network device in the network stack is stored on each network device in the network stack.

18. The system of claim 16 wherein a subset of the network devices in a same layer of a network are virtualized into Virtual Switching Framework (VSF) stack.

19. The system of claim 16 wherein a front-plane port of the network device is not coupled to an intermediary network device used for managing stack splits.

20. The system of claim 16, wherein the instructions that when executed by the processor cause the system further to:
- determine, in response to the network device not belonging to the first fragment, that the network device belongs in a second fragment of the network stack; and
- mark, by the network device, the second fragment as an inactive fragment of the network stack.

* * * * *